United States Patent [19]
Kishihara et al.

[11] Patent Number: 5,218,059
[45] Date of Patent: Jun. 8, 1993

[54] NON-TOXIC ANTIFOULING COATING COMPOSITION

[75] Inventors: Masato Kishihara; Kiyoshi Nanishi; Yoichi Yonehara, all of Hiratsuka, Japan

[73] Assignee: Kansai Paint Co., Ltd., Amagasaki, Japan

[21] Appl. No.: 662,821

[22] Filed: Mar. 1, 1991

[30] Foreign Application Priority Data

Mar. 5, 1990 [JP] Japan .................................. 2-53008

[51] Int. Cl.⁵ .................................................. C08L 83/04
[52] U.S. Cl. ......................................... 525/477; 528/33
[58] Field of Search ............................ 525/477; 528/33

[56] References Cited
FOREIGN PATENT DOCUMENTS 1-029475A 7/1989 Japan .

*Primary Examiner*—Melvyn I. Marquis
*Assistant Examiner*—D. E. Aylward
*Attorney, Agent, or Firm*—Fisher, Christen & Sabol

[57] ABSTRACT

A non-toxic antifouling coating composition containing 50 to 99% by weight as the resin solid content of (A) a reaction-curable silicone resin composition and 1 to 50% by weight a solid content of (B) a silicone resin having an average molecular weight of 250 to 30,000, a viscosity of 20 to 50,000 centistokes and alkoxy group at its molecular terminal, and represented by the general formula (I):

$$R_xSi(R^1-OR^2)_yO_{\frac{4-X-Y}{2}} \quad (I)$$

where R is hydrogen atom, alkyl group having 1-10 carbon atoms, aryl group or aralkyl group, $R^1$ is bivalent aliphatic hydrocarbon group having 1-10 carbon atoms, which may be bonded directly or through ether group, ester group or —NH— group, $R^2$ is lower alkyl group having 1-6 carbon atoms, X and Y are represented respectively as $0.01 \leq X < 4.0$, $0.01 \leq Y < 4.0$ and $0.02 \leq X+Y < 4$.

3 Claims, No Drawings

2

NON-TOXIC ANTIFOULING COATING COMPOSITION

BACKGROUND OF THE INVENTION (1) Field of the Invention

The present invention relates to a non-toxic antifouling coating composition free of a toxic antifouling agent, and more particularly to a coating composition which is coated on underwater structures such as ships, port facilities, buoys, pipelines, bridges, submarine stations, submarine oil field excavation facilities, water conduit raceway tubes in the power plant, cultivating fishing nets, stationary fishing nets and the like to provide an antifouling film which is formed on the surface of the underwater structure and which is suitable for preventing underwater living things from adhering and growing on the surface of the underwater structure.

(2) Description of the Prior Art

A large number of living things such as the barnacle, ascidian, serupulas, mussel, fresh-water mussel, polyzoan, green laver, sea lettuce and the like live in the waters of the sea, the river, the lake and swamp, etc., and of underwater structures including any surface parts of the structure that are splashed as well as parts that are submerged and these living things cause various types of damage. Adhesion of the living things to a ship, for example, increases frictional resistance to water and causes a reduction of the ships sailing speed, resulting in an increased fuel consumption in order to keep a constant sailing speed which is undesirable from an economical point of view. On the other hand, adhesion of the living things to stationary structures, which are fixed under water or on the surface of the water, for example, port facilities, makes it difficult for these facilities to satisfactorily fulfill their proper functions, and further results in constant attacks and a resultant wear and tear on the base materials of the facilities. Adhesion of the living things to cultivating fishing nets and stationary fishing nets may result in a blocking of the nets and cause the death of fish.

In order to prevent the underwater living things from adhering to the underwater structures and growing thereon, the antifouling coating compositions prepared by incorporating a toxic antifouling agent such as an organotin compound, copper suboxide or the like, have been coated on the underwater structures. A coating of the above antifouling coating composition on the underwater structures could almost prevent the underwater living things from adhering thereto and growing thereon. However, the use of the toxic antifouling agent is undesirable from the standpoints of environmental safety and hygiene during the preparation and coating of the above antifouling coating composition, and further the gradual leaching of the antifouling agent into the water may result in pollution in the water area with adverse effects on fish and shellfish over a long period of time. On the other hand, in order to solve the above problems, there has been proposed the non-toxic antifouling coating compositions, which are free of the above toxic antifouling agents, or which are prepared by use of an oligomer-like room temperature curing silicone resin alone, its mixture with silicone oil, or a mixture of the oligomer-like room temperature curing silicone resin with liquid paraffin or petrolatum. The use of the above non-toxic antifouling coating compositions all consists in reducing the surface tension of their films so as to impart antifouling properties, all resulting in poor antifouling properties and antifouling durability which causes problems in practical use.

As a non-toxic antifouling coating composition free of the above problems, there is proposed an antifouling coating composition which comprises a reaction-curable silicone resin and a silicone resin having a polar group such, as a hydroxyl group, amino group, carboxyl group, epoxy group or the like as a molecular terminal group (see Japanese Patent Application Laid-Open Nos. 252480/87 and 43973/88).

Exudation of the polar group-containing silicone resin which has poor compatibility to the surface due to volume shrinkage caused by the reaction-curing of the reaction-curable silicone resin results in breaking the base to which the underwater living things adhere to show good antifouling properties. Recently, however, further improvement in antifouling properties and antifouling durability has been highly demanded.

SUMMARY OF THE INVENTION

It is an object of the present invention to provide a non-toxic antifouling coating composition which has highly improved antifouling properties and antifouling durability.

It has been found that the use of an alkoxy group-containing silicone resin substantially incapable of reacting with the reaction-curable silicone resin and having an alkoxy group introduced at its molecular terminal through an ethylene oxide group or propylene oxide group between Si and the alkoxy group (hereinafter may be referred to simply as an alkoxy group-containing silicone resin) makes it possible to achieve the objective.

That is, the present invention provides a non-toxic antifouling coating composition containing 50 to 99 percent by weight as the resin solid content of (A) a reaction-curable silicone resin composition and 1 to 50 percent by weight as the solid content of (B) a silicone resin having an average molecular weight of 250 to 30,000, a viscosity of 20 to 50,000 centistokes and an alkoxy group at its molecular terminal, and represented by the general formula (I):

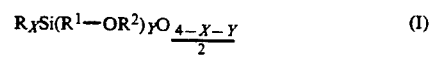

$$R_X Si(R^1-OR^2)_Y O_{\frac{4-X-Y}{2}} \quad (I)$$

where R is a hydrogen atom, an alkyl group having 1-10 carbon atoms, aryl group or aralkyl group, $R^1$ is a bivalent aliphatic hydrocarbon group having 1-10 carbon atoms, which may be bonded directly or through an ether group, ester group or —NH—group, $R^2$ is a lower alkyl group having 1-6 carbon atoms, X and Y are represented respectively as $0.01 \leq X < 4.0$, $0.01 \leq Y \leq 4.0$ and $0.02 \leq X+Y < 4$.

Typical components of the non-toxic antifouling coating composition of the present invention are explained more in detail as follows.

REACTION-CURABLE SILICONE RESIN

Composition (A)

The reaction-curable silicone resin composition used in the present invention comprises, as the major component, an organopolysiloxane which has a siloxane bond and is chemically reacted and cured at a room temperature lower than about 80° C., by heating at about 80° C. or higher, or by the irradiation of ultraviolet light or electron rays. The organopolysiloxane has such a structure that a curably reactive functional group and organic group are bonded directly to Si atom. Examples of the curably reactive functional group may include an hydroxyl group and a alkoxy group having 1 to 5 carbon atoms. Examples of the organic group may include a methyl group, ethyl group, vinyl group, haloalkyl group, phenyl group, etc. Further, to the organopolysiloxane may be added at least one selected from polyfunctional silane compounds which have a hydrolyzable group such as an cetoxy group, ketoxime group or the like as a crosslinking agent, and at least one selected from a group which consists of the octylates and naphthenates of zinc, iron, cobalt, tin etc., peroxides, organic amines, etc. as a curing catalyst respectively. The above silicone resin composition (A) is cured at room temperature or by heating according to hydrolyzation, dealcoholyzation, deacetification, dehydroxyamination, etc. The use of the organopolysiloxane having vinyl group makes possible curing by irradiation of electron rays or ultraviolet light. It is necessary for the irradiation of ultraviolet light to add a photosensitizer. Specific examples of a reaction-curable silicone resin composition containing organopolysiloxane as a major component include KE42, KE44 and KE45S (trade names, all marketed by Shin-Etsu Chemical Co., Ltd., a silicone varnish, one-pack type RTV rubber, reaction-curable at room temperature), KR2706 (trade name, marketed by Shin-Etsu Chemical Co., Ltd., a silicone varnish), SE9140 Dispersion (SE9140: trade name, one-pack type cold curing silicone coating composition, marketed by Toray Silicone Co., Ltd.), SH237 Dispersion (SH237: trade name, Silicone Release Agent, marketed by Toray Silicone Co., Ltd.), Pelgan ® C (trademark, cold curing silicone varnish, marketed by Dow Corning K.K.), and FS XR-2622 (trade name, cold curing elastplastic silicone varnish, marketed by Dow Corning K.K.).

Alkoxy group-containing silicone resin (B)

The alkoxy group-containing silicone resin used in the present invention is a silicone resin having an average molecular weight of 250 to 30,000, a viscosity of 20 to 50,000 centistokes and an alkoxy group, preferably a methoxy group and an ethoxy group at its molecular terminal, and represented by the general formula (I):

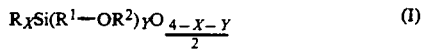

where R is a hydrogen atom, an alkyl group having 1-10 carbon atoms, an aryl group or aralkyl group, $R^1$ is a bivalent aliphatic hydrocarbon group having 1-10 carbon atoms, which may be bonded directly or through an ether group, ester group or —NH—group, $R^2$ is a lower alkyl group having 1-6 carbon atoms, X and Y are represented respectively as $0.01 \leq X < 4.0$, $0.01 \leq Y < 4.0$ and $0.02 \leq X+Y < 4$.

Examples of the alkoxy group-containing silicone resin include KF351 (trade name, marketed by Shin-Etsu Chemical Co., Ltd., polyether modified silicone oil, viscosity: 100 cp at 25° C.), KF353 (trade name, marketed by Shin-Etsu Chemical Co., Ltd., polyether modified silicone oil, viscosity: 400 cp at 25° C.), SH3749 (viscosity: 1300 cp), BX16-034 (viscosity: 630 cp) and SF8410 (viscosity: 2900), all marketed by Toray Silicone Co., Ltd., polyether modified silicone oil, and ISI4452 (trade name, marketed by Toshiba Silicone Co., Ltd., silicone-polyether copolymer, viscosity: 1,000 cp at 25° C.).

The alkoxy group-containing silicone resin used in the present invention may have a mean molecular weight of 250 to 30,000, preferably 1,000 to 20,000. When the molecular weight is less than 250, the resulting film shows poor drying characteristics, and when the molecular weight is more than 30,000, the exudation effect of the alkoxy group-containing silicone resin to the surface is not realized, resulting in poor antifouling properties.

When the viscosity of the alkoxy group-containing silicone resin is lower than 20 centistokes, it may be exuded to the surface, but could not retain itself thereon, thereby making it impossible to obtain the intended antifouling performance. On the other hand, when the viscosity is higher than 50,000 centistokes, its exudation to the surface becomes impossible, thereby making it impossible to obtain the intended antifouling performance.

The alkoxy group-containing silicone resin contains an alkoxy group preferably in an amount of 0.1 to 15 percent by weight.

The alkoxy group-containing silicone resin is formulated in the aforementioned proportion, i.e. in an amount of 1 to 50 percent by weight, preferably 2 to 30 percent by weight with the reaction-curable silicone resin composition (A), and the resulting cured film obtained by curing at room temperature, heat curing or irradiation of actinic rays shows excellent antifouling properties. When the amount of the alkoxy group-containing silicone resin is less than 1 percent by weight, the antifouling effect is reduced. On the other hand, when more than 50 percent by weight, the curing properties of the resulting film becomes poor, thereby making it impossible to obtain a coated film which has the satisfactory durability required for the antifouling coated film.

The non-toxic antifouling coating composition may include, when needed, chlorinated paraffin, solid paraffin, liquid paraffin, dimethylsiloxane, methylphenylsiloxane, etc. in an amount of about 10 parts by weight or less per 100 parts by weight of the coating composition, and further may include pigments such as extender pigments, color pigments, corrosion-resistant pigments and the like, plasticizers, anti-sag agents, antifouling agents, etc. depending on the film performance required.

The present invention makes it possible to provide a non-toxic antifouling coating composition capable of forming a coated film which is non-toxic and shows excellent antifouling properties over a long period of time.

The reasons for the above results as provided by the present invention are explained more in detail as follows.

It has been proposed by R.E. Baier that a substance which has a micromosaic structure has the effect of inhibiting adsorption of protein, adhesion of bacteria, and growth of diatom and large-sized living things on the surface of the above substance respectively.

The alkoxy group-containing silicone resin used in the present invention, as its constitution, has a polysiloxane bond, has an alkoxy group at its molecular terminal through an ethylene oxide group or propylene oxide group between Si and the alkoxy group, and has both a hydrophobic group and hydrophilic group in the molecule. Previously, the present inventors proposed that a combination of a hydroxyl group- or polar group-containing silicone resin with a reaction-curable silicone resin makes it possible to form the above micromosaic structure, and found that the above micromosaic structure was actually formed by use of a phase-contrast microscope and showed significant effects on markedly inhibiting adsorption of protein to its surface and on inhibiting adhesion of bacteria, diatom and large-sized living things to its surface. Now, however, it has been found that the non-toxic antifouling coating composition which contains the alkoxy group-containing silicone resin in the present invention shows a finer and more uniform hydrophilic/hydrophobic or hydrophobic/hydrophobic micromosaic structure, and the use of the coating composition of the present invention provides such effects as to even further inhibit the adsorption of protein to its surface, and makes it possible to inhibit the adhesion of the above living things to its surface for a long period of time.

Thus, it is considered that the antifouling coating composition of the present invention is capable of maintaining excellent antifouling properties for a long period of time without using toxic antifouling agents.

The present invention is explained more in detail by the following Examples and Comparative Examples, in which "part" means "part by weight" unless otherwise expressed. The Examples are not to be construed as limiting the scope of the present invention.

EXAMPLES 1-3 AND COMPARATIVE EXAMPLES 1-3

Non-toxic antifouling coating compositions were prepared according to the formulation shown in Table 1 respectively.

TABLE-1

| Formulation (parts) | Examples | | | Comparative Examples | | |
|---|---|---|---|---|---|---|
| | 1 | 2 | 3 | 1 | 2 | 3 |
| KE42 (*1) | 40 | | | 40 | | |
| KE44 (*2) | | 25 | | | 35 | |
| SH237 (*3) | | | 35 | | | 35 |
| KF351 (*4) | 10 | | | | | |
| BX16-034 (*5) | | 25 | | | | |
| ISI4452 (*6) | | | 15 | | | |
| SF8428 (*7) | | | | 10 | | |
| ISI4700 (*8) | | | | | 15 | |
| XI42-411 (*9) | | | | | | 15 |
| Aerosil ® #200 (*10) | 0.5 | 0.5 | 0.5 | 0.5 | 0.5 | 0.5 |
| Xylene | 49.5 | 49.5 | 49.5 | 49.5 | 49.5 | 49.5 |
| Total | 100.0 | 100.0 | 100.0 | 100.0 | 100.0 | 100.0 |

In Table-1, (*1)-(*3) mean trade names of organopolysiloxane as above mentioned respectively, (*4)-(*6) means trade names of alkoxy group-containing silicone resins as above mentioned respectively, (*7) means a trade name of alcohol-modified silicone oil (viscosity: 130 cp) marketed by Toray Silicon Co., Ltd., (*8) means a trade name of amino-modified silicone oil (viscosity: 50 cp at 25° C.) marketed by Toshiba Silicone Co., Ltd., (*9) means a trade name of carboxyl modified silicone oil (viscosity: 100 cp at 25° C.) prepared by way of trial, i.e., experimental basis, by Toshiba Silicone Co., Ltd., and (*10) means a trademark of an extremely pure amorphous silica marketed by Nihon Aerosil Co., Ltd.

PERFORMANCE TEST RESULTS

A zinc epoxy shop primer was coated onto a sandblasted steel sheet of 100 mm × 300 mm × 2 mm to a dry film thickness of 15 μm, and an epoxy anticorrosive coating composition was coated thereonto to a dry film thickness of 200 μm to obtain a coated steel sheet, followed by the antifouling coating compositions obtained in the Examples and Comparative Examples which were coated onto the coated steel sheet to a dry film thickness of 100 μm respectively to obtain coated test sheets. The coated test sheets were dried for 7 days at room temperature, followed by being dipped into seawater in Toba Bay, Mie-ken, Japan for 24 months to evaluate antifouling properties. The results ar shown in Table-2, in which "%" means a percentage of an area in which adhesion takes place relative to a total area of the coated test sheet.

TABLE-2

| | Antifouling properties in seawater | |
|---|---|---|
| | Adhesion of green laver (%) | Adhesion of barnacle (%) |
| Examples 1 | 0 | 0 |
| Examples 2 | 0 | 0 |
| Examples 3 | 0 | 0 |
| Comparative Examples | | |
| 1 | 10 | 5 |
| 2 | 20 | 15 |
| 3 | 10 | 15 |

What is claimed is:

1. A non-toxic antifouling coating composition comprising: 50 to 99 percent by weight as the resin solid content of (A) a reaction-curable silicone resin composition containing, as a major component, an organopolysiloxane having siloxane bonds and having such a structure that an organic group and a curably reactive functional group selected from a group consisting of a hydroxyl group and an alkoxy group, are bonded directly to a Si atom at the molecular terminal, and 1 to 50 percent by weight as the solid content of (B) a silicone resin having an average molecular weight of 250 to 30,000, a viscosity of 20 to 50,000 centistokes and a polysiloxane bond as a hydrophobic group, and represented by the general formula (I):

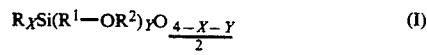

$$R_X Si(R^1\text{---}OR^2)_Y O_{\frac{4-X-Y}{2}} \quad (I)$$

wherein R is a hydrogen atom, an alkyl group having 1 to 10 carbon atoms, an aryl group or an aralkyl group, $R^1$ is a bivalent aliphatic hydrocarbon group having 1 to 10 carbon atoms and containing a group having a hydrophilic group selected from a group consisting of an ether group, an ester group and ―NH―group, $R^2$ is a lower alkyl group having 1 to 6 carbon atoms, X and Y are represented, respectively, as $0.01 \leq X+Y<4$, $0.01 \leq Y<4.0$ and $0.02 \leq X+Y<4$, said bivalent aliphatic hydrocarbon group being linked between Si and $OR^2$ as the alkoxy group at the molecular terminal.

2. A non-toxic antifouling coating composition as claimed in claim 1 wherein said alkoxy group-containing silicone resin (B) contains alkoxy groups in an amount of 0.1 to 15 percent by weight.

3. A non-toxic antifouling coating composition as claimed in claim 1 wherein said group having the hydrophilic group is selected from a group consisting of a ethylene oxide group and a propylene oxide group.

* * * * *